United States Patent
Kreutle et al.

(10) Patent No.: US 8,776,524 B2
(45) Date of Patent: Jul. 15, 2014

(54) FUEL DISTRIBUTION SYSTEM FOR A GAS TURBINE WITH MULTISTAGE BURNER ARRANGEMENT

(75) Inventors: Christian Kreutle, Baden-Daettwil (CH); Martin Zajadatz, Kuessaberg/Dangstetten (DE); Simone Camponovo, Baden (CH)

(73) Assignee: Alstom Technology Ltd., Baden (CH)

( * ) Notice: Subject to any disclaimer, the term of this patent is extended or adjusted under 35 U.S.C. 154(b) by 1305 days.

(21) Appl. No.: 12/326,704

(22) Filed: Dec. 2, 2008

(65) Prior Publication Data
US 2009/0145131 A1    Jun. 11, 2009

(30) Foreign Application Priority Data
Dec. 10, 2007    (CH) .................................. 1918/07

(51) Int. Cl.
F02C 7/228    (2006.01)
F02C 9/32     (2006.01)

(52) U.S. Cl.
USPC .............................. 60/739; 60/740

(58) Field of Classification Search
CPC .... F02C 7/228; F02C 9/32–9/34; F23R 3/346
USPC .......................... 60/734, 739, 740
See application file for complete search history.

(56) References Cited

U.S. PATENT DOCUMENTS

| | | | | |
|---|---|---|---|---|
| 2,944,388 A * | 7/1960 | Bayer | ................ | 60/740 |
| 2,963,862 A * | 12/1960 | Jay | ................... | 60/739 |
| 3,397,536 A * | 8/1968 | Davies et al. | ................ | 60/746 |
| 4,920,740 A * | 5/1990 | Shekleton | ................ | 60/739 |
| 4,932,861 A | 6/1990 | Keller et al. | | |
| 5,311,742 A | 5/1994 | Izumi et al. | | |
| 5,588,826 A | 12/1996 | Dobbeling et al. | | |
| 6,293,105 B1 | 9/2001 | Claesson et al. | | |
| 6,405,524 B1 * | 6/2002 | Mistry et al. | ................ | 60/739 |
| 6,857,272 B2 * | 2/2005 | Summerfield et al. | .......... | 60/739 |
| 7,269,939 B2 * | 9/2007 | Kothnur et al. | ........... | 60/39.281 |
| 7,610,745 B2 * | 11/2009 | Fujii et al. | ................ | 60/746 |
| 7,780,437 B2 | 8/2010 | Bernero et al. | | |
| 2008/0271456 A1 * | 11/2008 | Scully et al. | ............... | 60/740 |

FOREIGN PATENT DOCUMENTS

| | | |
|---|---|---|
| EP | 0321809 A1 | 6/1989 |
| EP | 1067338 A  | 1/2001 |
| EP | 0704657 B1 | 11/2001 |
| EP | 0969192 A1 | 12/2008 |
| EP | 1645802 A2 | 4/2012 |
| GB | 2174147 A  | 10/1986 |
| WO | 0196785 A1 | 12/2001 |
| WO | 2005010437 A1 | 2/2005 |
| WO | 2005093327 A1 | 10/2005 |

* cited by examiner

Primary Examiner — Ted Kim
(74) Attorney, Agent, or Firm — Buchanan Ingersoll & Rooney P.C.

(57) ABSTRACT

A fuel distribution system for a gas turbine with multistage burner arrangement is provided having at least one distribution line that branches off from a common fuel feed line and leads to a burner stage, and at least one element is provided in each distribution line for the specific influencing of the fuel mass flow. In such a fuel distribution system simplified controlling is made possible by a control valve being arranged in each case in one section of the distribution lines as an element for the specific influencing of the fuel mass flow, and in that a restrictor, which is preset in a fixed manner, is arranged in each case in the remaining distribution lines as an element for the specific influencing of the fuel mass flow.

4 Claims, 2 Drawing Sheets

US 8,776,524 B2

FUEL DISTRIBUTION SYSTEM FOR A GAS TURBINE WITH MULTISTAGE BURNER ARRANGEMENT

FIELD OF INVENTION

The present invention refers to the field of gas turbines. It relates to a fuel distribution system for a gas turbine with multistage burner arrangement.

BACKGROUND

In gas turbines with a plurality of burner stages which are in operation at the same time, it is known to realize feed of the burner stages with fuel via two or more regulated control valves and ring mains in each case, depending upon the number of "burner stagings" (see, for example, WO-A1-2005/093327). Such an arrangement is exemplarily reproduced in a much simplified form in FIG. 1. The fuel distribution system 10 of FIG. 1 comprises a plurality of burner stages of which the two first burner stages 11 and 12 are explicitly shown. Each of the burner stages comprises one or more burners 13 or 14 which are connected to a common fuel ring main 15 or 16. Each of the fuel ring mains 15, 16 is connected via a distribution line 19, 20, 21 to a common fuel feed line 18 via which the fuel is supplied for the entire burner system. Control valves 22, 23, 24, which are connected to a control unit 17 and are controlled or regulated by the control unit 17, are arranged in each case in the distribution lines 19, 20, 21.

Depending upon the operating point, the required fuel mass flow for the respective burner stage 11, 12 is adjusted via the control valves 22, 23, 24. In this case, a fuel feed stage at low load and when starting the gas turbine is normally designed so that fuel-rich zones are locally established in the burner flow field and ensure a broad operating field of the burner. In the higher load range, this fuel feed is noticeably reduced in order to realize low emissions values (see: EP-B1-0 704 657 and WO-A1-01/96785).

The fuel feed which is established for the lower load range in this case is to preferably have higher pressure loss with regard to the fuel feed so that in full load operation with low throughputs a sufficient fuel distribution across the burners can be ensured. On the other hand, during ignition and when starting the gas turbine a sufficiently smaller fuel mass flow has to be established in order to avoid over-firing of the turbine. Since a multiplicity of control valves have to be adjusted and regulated at the same time, instabilities in the controlling behavior of the fuel feed may occur, which can lead to increased pollutant emission and pulsations in the combustion chamber.

SUMMARY

The present disclosure is directed to a fuel distribution system for a gas turbine with multistage burner arrangement. The system includes at least one distribution line that branches off from a common fuel feed line and is led to a burner stage. At least one element for the specific influencing of the fuel mass flow is provided in the at least one distribution line and a control valve is arranged in a section of the at least one distribution line as an element for the specific influencing of the fuel mass flow. A restrictor, which is preset in a fixed manner, is arranged in the remaining distribution lines as an element for the specific influencing of the fuel mass flow.

BRIEF DESCRIPTION OF THE DRAWINGS

The invention is subsequently to be explained in more detail based on exemplary embodiments in conjunction with the drawing. In the drawing

DETAILED DESCRIPTION OF THE PREFERRED EMBODIMENTS

Introduction to the Embodiments

A fuel distribution system for gas turbines is provided, which avoids the disadvantages of known fuel distribution systems and is especially characterized by the possibility for a simplified controlling method and a low-emissions and pulsation-free operation.

It is a feature of the invention that a control valve is arranged in each case in one section of the distribution lines as an element for the specific influencing of the fuel mass flow, and that a restrictor, which is preset in a fixed manner, is arranged in each case in the remaining distribution lines as an element for the specific influencing of the fuel mass flow.

One development of the invention is that a control valve is arranged only in one of the distribution lines, and the single control valve is arranged in the distribution line which leads to the first burner stage. As a result of this, especially simple controlling can be achieved.

According to another development of the invention, the restrictors in the distribution lines are selected so that the respective fuel portions of the individual burner stages are adjusted to a fuel ratio which is favorable for the load range of the gas turbine. The control valve, or the control valves, is or are preferably controlled by a control unit.

A further development of the invention is that the burners of the individual burner stages are connected in each case to a common fuel ring main, and in that the fuel ring mains are connected in each case via one of the distribution lines to the common fuel feed line.

DETAILED DESCRIPTION

Figure 1:
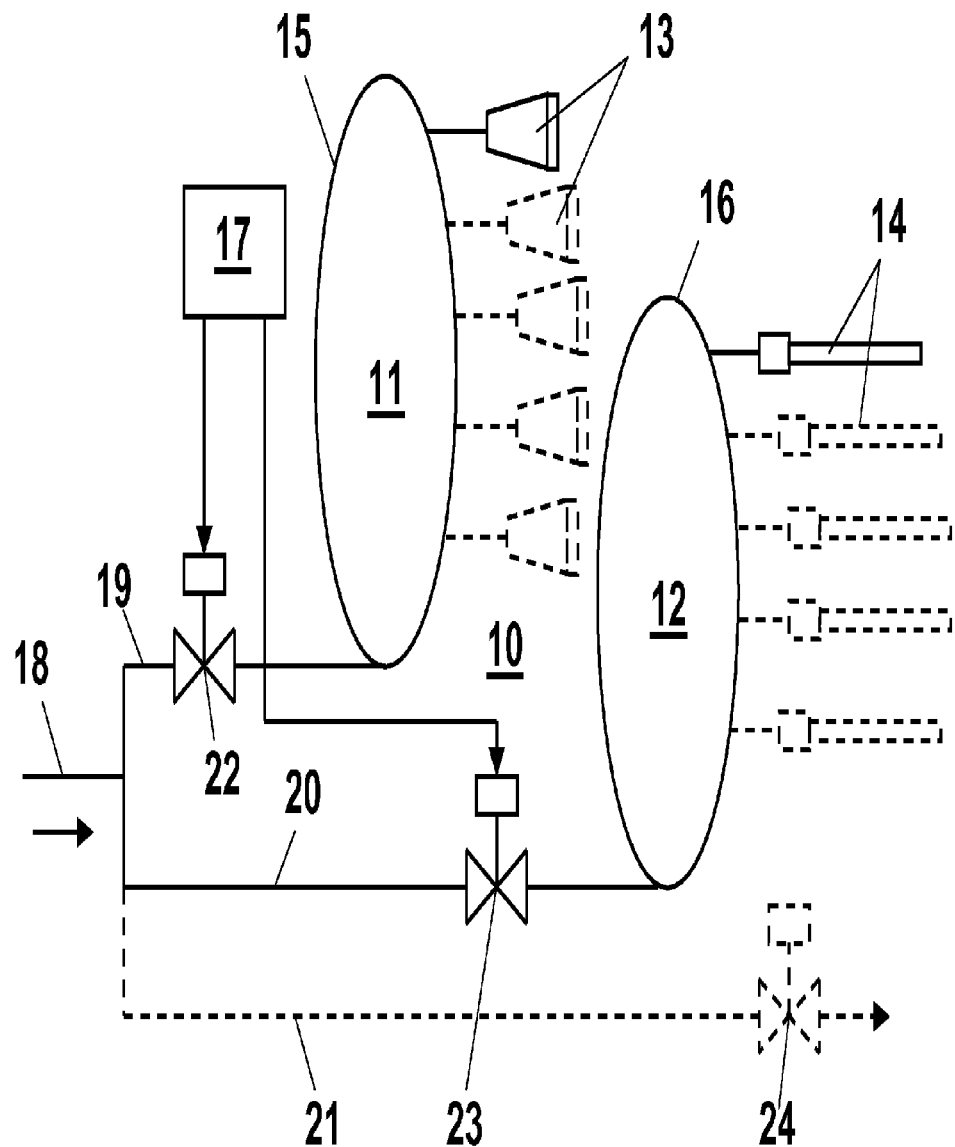
FIG. 1 shows a much simplified schematic representation of a fuel distribution system with control valves in all the distribution lines, as is known from the prior art.
Figure 2:
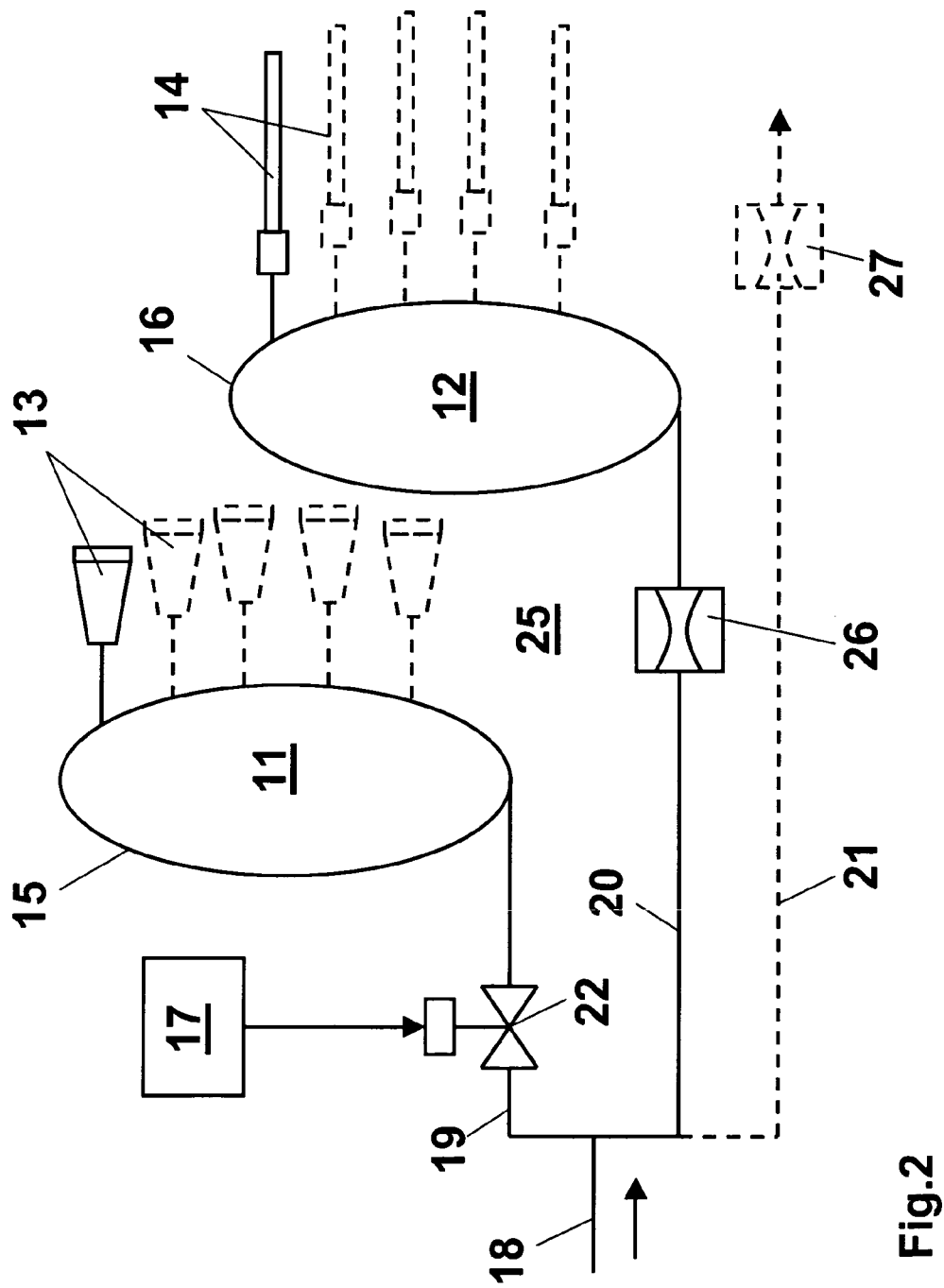
FIG. 2 shows in a view which is comparable to FIG. 1 a fuel distribution system according to a preferred exemplary embodiment of the invention.

In FIG. 2, a fuel distribution system according to a preferred exemplary embodiment of the invention is reproduced in a view which is comparable to FIG. 1. The fuel distribution system 25 of FIG. 2 also comprises a plurality of burner stages of which the two first burner stages 11 and 12 are explicitly shown. Each of the burner stages comprises one or more burners 13, 14 which are connected to a common fuel ring main 15 or 16. The burners 13 of the first stage in this case can especially be so-called double-cone burners, as are known for example from EP-A2-1 645 802 (see, for example, FIG. 1 there). The burners 14 of the second stage, as shown in EP-A2-1 645 802, can be formed as fuel lances and can be concentrically arranged in the double-cone burners. Each of the fuel ring mains 15, 16 is connected via a distribution line 19, 20, 21 to a common fuel feed line 18 via which the fuel is supplied for the entire burner system. Different elements 22, 26, 27 for the specific influencing of the fuel mass flow are now arranged in the distribution lines 19, 20, 21. A control valve 22, which is controlled or regulated by a control unit 17, is installed in the distribution line 19 of the first stage as an element for the specific influencing of the fuel mass flow. On the other hand, passive elements for the specific influencing of the fuel mass flow, specifically restrictors 26, 27 which are preset in a fixed manner, are installed in the remaining distribution lines 20, 21 of the further stages. In the case of the present invention according to FIG. 2, therefore, only one control valve 22 is used for adjusting the fuel mass flow for the primary stage, compared with the conventional solution. The adjustment of the mass flows for the individual burner stagings is realized via restrictors 26, 27 which are installed in a fixed manner.

Contrary to the conventional solution, only the fuel mass flow for the primary burner stage 11 has to be regulated in this case, while the mass flows of the other burner stage(s) 12 are created via the initial pressure and the pressure loss across the restrictors 26, 27 in the secondary stages. A significantly simplified operating concept of the system results from this. The respective fuel portions of the individual stages, with correctly dimensioned restrictors 26, 27, should adjust to a fuel ratio which is favorable for the load range. In this case, however, the burner must be designed with regard to fuel stagings.

As a result of the saving of one control valve, possible instabilities in the controlling behavior of the fuel feed are reduced since in this case only the main valve 22 has to be controlled and the other mass flows are automatically adjusted based on the flow resistance which is created by the restrictor(s) 26, 27.

This also brings certain advantages in the case of a sudden load shedding of the gas turbine. Thus, the fuel mass flow can be reduced significantly quicker in a controlled manner in this case without possible control valve fluctuations and fuel stagings for the individual operating points having to be reacted to in the process since these are automatically adjusted.

With the system described above, the following typical characteristics and advantages can be combined:

Simplified controlling behavior and fuel supply system for a gas turbine in oil and gas operation.

Use of gas turbine burners with more than one fuel stage in operation at the same time.

Low-emissions and pulsation-free operation when combusting liquid and gaseous fuels in a gas turbine combustion chamber.

Use of wet and dry oil combustion.

Control of CO emissions and NOx emissions within the entire load range.

Use of annular combustion chambers, pot-type combustion chambers, silo combustion chambers and tubular combustion chambers with single or multiple burner arrangements.

LIST OF DESIGNATIONS

10, 25 Fuel distribution system
11, 12 Burner stage
13, 14 Burner
15, 16 Fuel ring main
17 Control unit
18 Fuel feed line
19, 20, 21 Distribution line
22, 23, 24 Control valve
26, 27 Restrictor

What is claimed is:

1. A fuel distribution system, for a gas turbine with multi-stage burner arrangement having at least three stages, each stage comprising a plurality of burners connected by a common burner fuel ring, the plurality of burners being specific to the individual stage, the system comprising a plurality of distribution lines that branch directly off from a common fuel feed line and extend to each of the burner rings of each stage; in each of the distribution lines, a respective single element that provides the only specific influencing of the fuel mass flow is provided for each of the distribution lines; a control valve is arranged in a section of only one of the distribution lines as the element for the specific influencing of the fuel mass flow; and in each of the remaining distribution lines a restrictor, which is preset in a fixed manner, is arranged as the single element for the specific influencing of the fuel mass flow.

2. The fuel distribution system as claimed in claim 1, wherein the single control valve is arranged in the distribution line which leads to a first burner stage.

3. The fuel distribution system as claimed in claim 1, wherein the restrictors in the remaining distribution lines are selected so that respective fuel portions of the individual burner stages are adjusted to a fuel ratio which is favorable for a load range of the gas turbine.

4. The fuel distribution system as claimed in claim 1, wherein the control valve is controlled by a control unit.

* * * * *